US008463454B2

(12) United States Patent
Ilyes

(10) Patent No.: US 8,463,454 B2
(45) Date of Patent: Jun. 11, 2013

(54) WIRELESS BALLAST CONTROL UNIT

(75) Inventor: Laszlo Sandor Ilyes, Richmond Heights, OH (US)

(73) Assignee: General Electric Company, Schenectady, NY (US)

( * ) Notice: Subject to any disclaimer, the term of this patent is extended or adjusted under 35 U.S.C. 154(b) by 366 days.

(21) Appl. No.: 12/691,798

(22) Filed: Jan. 22, 2010

(65) Prior Publication Data

US 2011/0184577 A1 Jul. 28, 2011

(51) Int. Cl.
*G05D 11/00* (2006.01)

(52) U.S. Cl.
USPC .............................. 700/295; 315/312; 307/40

(58) Field of Classification Search
USPC ..................... 700/295, 296; 315/312; 307/40
See application file for complete search history.

(56) References Cited

U.S. PATENT DOCUMENTS

| | | | | |
|---|---|---|---|---|
| 5,726,644 | A * | 3/1998 | Jednacz et al. | 340/9.14 |
| 5,962,989 | A * | 10/1999 | Baker | 315/294 |
| 7,167,777 | B2 * | 1/2007 | Budike, Jr. | 700/297 |
| 2003/0209999 | A1 * | 11/2003 | Hui et al. | 315/294 |
| 2003/0222603 | A1 * | 12/2003 | Mogilner et al. | 315/294 |
| 2006/0025891 | A1 * | 2/2006 | Budike, Jr. | 700/275 |
| 2006/0126617 | A1 | 6/2006 | Cregg | |
| 2006/0208661 | A1 * | 9/2006 | Mogilner et al. | 315/209 R |
| 2008/0036401 | A1 * | 2/2008 | Erhardt | 315/349 |
| 2009/0236910 | A1 * | 9/2009 | Yamada et al. | 307/40 |
| 2009/0271042 | A1 * | 10/2009 | Voysey | 700/275 |
| 2009/0278479 | A1 * | 11/2009 | Platner et al. | 315/312 |
| 2010/0280677 | A1 * | 11/2010 | Budike, Jr. | 700/296 |

FOREIGN PATENT DOCUMENTS

EP 2088836 A1 8/2009

OTHER PUBLICATIONS

PCT Search Report issued in connection with corresponding WO Patent Application No. US11/20105 filed on Jan. 4, 2011.

* cited by examiner

*Primary Examiner* — Mohammad Ali
*Assistant Examiner* — Anthony Whittington
(74) *Attorney, Agent, or Firm* — Fay Sharpe LLP

(57) ABSTRACT

A ballast control unit for controlling at least one light output of at least one dimmable ballast is disclosed, in which the dimmable ballast powers one or more light sources via the light output(s). The ballast control unit includes a wireless interface provisioned to receive messages from a mesh network, and to retransmit the received messages not destined for the ballast control unit. The ballast control unit further includes a control module provisioned to control the dimmable ballast(s) and the light output(s) according to commands in the received messages destined for the ballast control unit, where the commands correspond to the dimmable ballast(s) and/or the light output(s).

8 Claims, 2 Drawing Sheets

WIRELESS BALLAST CONTROL UNIT

BACKGROUND OF THE DISCLOSURE

The present exemplary embodiments relate generally to lighting systems. They find particular application in conjunction wireless dimming arrangements for lighting systems and will be described with particular reference thereto. However, it is to be appreciated that the present exemplary embodiments are also amenable to other like applications.

Discharge lighting systems, such linear fluorescent lighting systems and high density discharge lighting systems, commonly include dimming control. A widely accepted standard for dimming control of this sort is 0-10V dimming control.

While 0-10V dimming control is considered straightforward to implement, it requires two low-voltage wires running between fixtures and a dimming controller. Unfortunately, situations may arise where it is highly burdensome or impossible to run additional wires between the fixtures and the dimming controller. In a retrofit situation, for example, it would be highly burdensome to run additional wires through walls and ceilings. In the case of a suspended fixture, for example, it may be impossible to run additional wires to the suspended fixture. Consequently, wireless dimming arrangements have been gaining favor.

Known wireless dimming arrangements generally depend upon an infrastructure of interconnected base stations for wireless communication in which wireless devices communicate with each other via the base stations. However, such an infrastructure is costly to both maintain and install, and may require additional wires to be run through walls and ceilings. Accordingly, it would be advantageous to have a low cost lighting system that did not depend upon network infrastructure.

SUMMARY OF THE DISCLOSURE

A ballast control unit is provided for controlling at least one light output of at least one dimmable ballast. The dimmable ballast powers one or more light sources via the light output (s). The ballast control unit includes a wireless interface provisioned to receive messages from a mesh network and to retransmit received messages not destined for the ballast control unit. The ballast control unit further includes a control module provisioned to control the dimmable ballast(s) and the light output(s) according to commands in the received messages destined for the ballast control unit. Each of the commands corresponds to the dimmable ballast(s) or the light output(s).

A method is provided for controlling at least one light output of at least one dimmable ballast that powers one or more light sources via the light output(s). The method includes receiving a message from a mesh network and determining if the message has reached its destination. If not, the received message is retransmitted, and if the received message has reached its destination, the ballast(s) and the light output(s) are controlled according to commands in the received message. Each of the commands corresponds to the ballast(s) or the light output(s).

A lighting system is provided for controlling at least one light output of at least one dimmable ballast via a mesh network, where the dimmable ballast powers one or more light sources via the light output(s). The lighting system includes a ballast control unit having a wireless interface provisioned to receive messages from the mesh network, and to retransmit received messages not destined for the ballast control unit. The ballast control unit further includes a control module provisioned to control the ballast(s) and the light output(s) according to commands in the received messages destined for the ballast control unit. The lighting system further includes a dimming unit provisioned to transmit messages over the mesh network, where each of the transmitted messages includes an ON/OFF command and/or a dimming command.

DETAILED DESCRIPTION OF THE PREFERRED EMBODIMENTS

Figure 1:
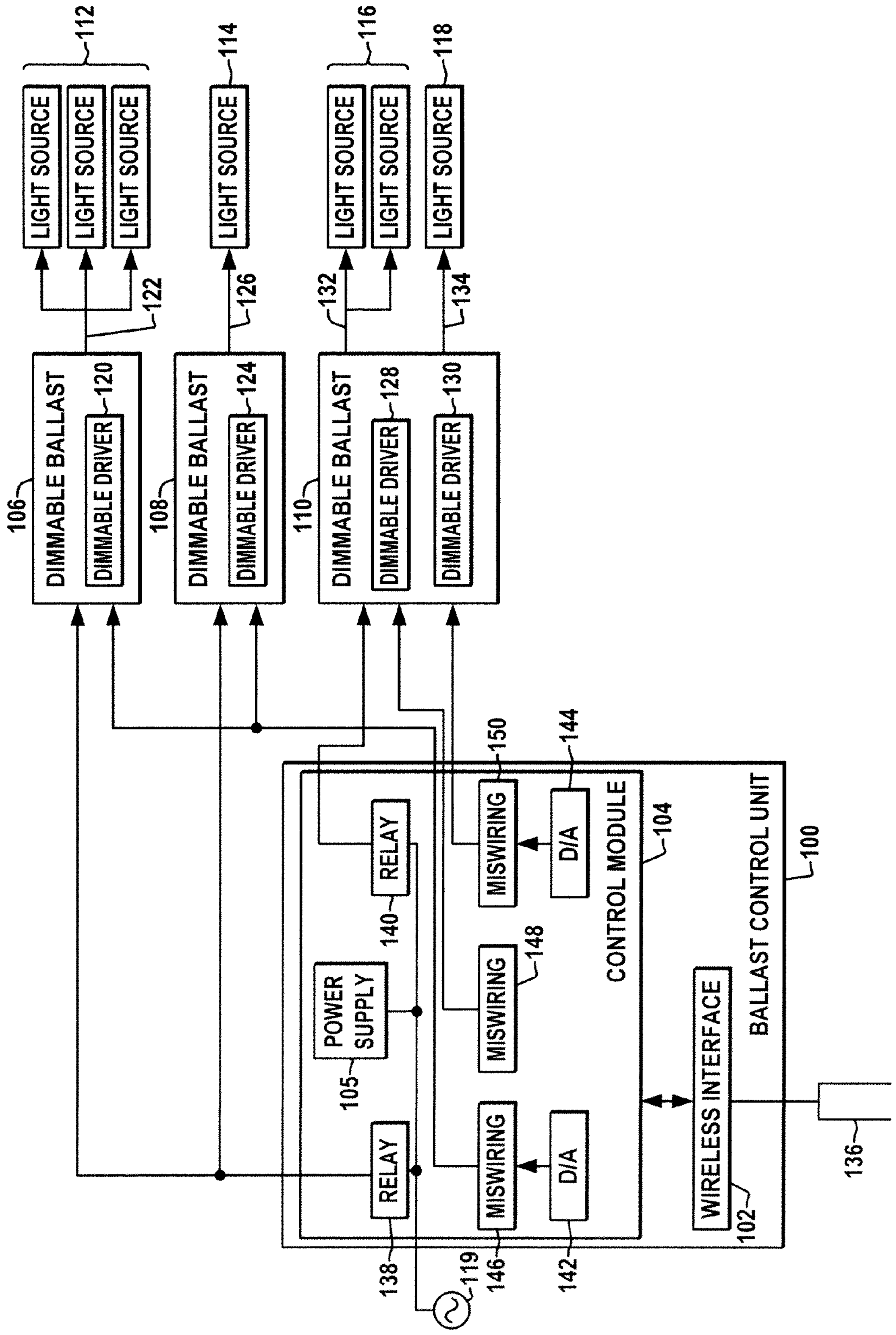
FIG. 1 illustrates an exemplary ballast control unit.

Lighting system embodiments are disclosed having a ballast control unit for controlling one or more dimmable ballasts. Each of the dimmable ballasts includes one or more dimmable drivers, and each of the dimmable drivers is, for example, an inverter. Additionally, each of the dimmable drivers is connected to a light output, which is connected to one or more light sources. The light sources are preferably discharge light sources, such as linear fluorescent light sources and high density discharge light sources. However, it should be appreciated that other light sources are equally amenable.

A control module of the ballast control unit selectively controls power to each of the dimmable ballasts and/or provides a dimming signal to each of the dimmable drivers to control the dimming of the light outputs. In certain embodiments, 0-10V dimming control is used, but other dimming controls are equally amenable. For example, the ballast control unit may simply provide a digital dimming signal, instead of a 0-10V dimming signal, to a dimmable driver. The dimming signal may further be passed through a miswiring circuit so as to protect the ballast control unit from damage caused by installation miswiring.

The control module selectively controls the dimmable ballasts and the light outputs based upon messages received from a wireless interface. Each of the messages contains one or more commands and each of the commands is an ON/OFF command and/or a dimming command. In the case of an ON/OFF command, the command is correlated with one or more dimmable ballasts. In the case of a dimming command, the command is correlated with one or more light outputs. Notwithstanding the enumerated commands, additional commands are equally amenable to the disclosed embodiments.

The wireless interface receives the messages from a mesh network. The mesh network, in certain embodiments, is a ZigBee mesh network, but other protocols for implementing the mesh network may be used. The wireless interface acts as a router and retransmits received messages that are not destined for the ballast control unit, thereby facilitating establishment and operation of the mesh network. Additionally, if a message is destined for the ballast control unit, the message is relayed to the control module and the command therein is used to control the dimmable ballasts and/or the light outputs.

The mesh network, in certain embodiments, includes a coordinator unit. There will only be a single coordinator per mesh network. Upon initiating any network device, such as the ballast control unit, the network device registers with the coordinator unit using a unique id. In the case of the ballast control unit, the registration process may include messages notifying the coordinator unit of the capabilities of the ballast control unit, for example, how many dimmable ballasts and light outputs the ballast control unit controls. Other network devices may include light switches, dimming switches, motion sensors, and other like devices.

The coordinator unit coordinates the ballast control unit with any other network devices. Namely, the coordinator unit sends messages to the ballast control unit containing commands operative to control the dimmable ballasts and the light outputs. The coordinator unit may act based upon internal stimuli, such as an internal clock or timer, or external stimuli, such as an event triggered by a network device or a user. Accordingly, the coordinator unit may, for example, instruct the ballast control unit to power on light outputs at a certain time or to power on light outputs in response to motion sensed by a motion sensor device.

The coordinator unit may be either a dedicated network device or integrated with another network device having additional functions. For example, the ballast control unit may act as the coordinator unit in addition to its above described functionality, or the coordinator may be integrated into a user-operable dimming control, etc. Additionally, not every network device within the mesh network need necessarily act as a router. For example, a motion sensor device may only include a transmitter.

Although the foregoing discussion pertained to a single ballast control unit, a lighting system may include a plurality of ballast control units. Additionally, while the foregoing discussed the ballast control unit receiving commands from the coordinator unit, other network devices may be provisioned to directly address the ballast control unit. For example, a wireless remote may directly send an ON/OFF command to the ballast control unit instructing it to power off all of its dimmable ballasts.

FIG. 1 illustrates a ballast control unit 100, which is identified by a unique id and which includes a wireless interface 102 and a control module 104 having a power supply 105. The ballast control unit 100 is connected to a plurality of dimmable ballasts 106, 108, 110, which are connected to a plurality of light sources 112, 114, 116, 118. By controlling the dimmable ballasts 106, 108, 110, the ballast control unit 100 is able to control the plurality of light sources 112, 114, 116, 118. The ballast control unit 100 further receives power from an external power supply 119 via the power supply 105 of the control module 104.

The first dimmable ballast 106 includes a single dimmable driver 120, whereby it has a single dimmable light output 122. This light output 122 is connected to a plurality of light sources 112. The second dimmable ballast 108 includes a single dimmable driver 124, whereby it too has a single dimmable light output 126 connected to a single light source 114. The third exemplary dimmable ballast 110 includes two dimmable drivers 128, 130, whereby it has two dimmable light outputs 132, 134. The first dimmable light output 132 is connected to a plurality of light sources 116, and the second dimmable light output 134 is connected to a single light source 118.

The dimmable drivers 120, 124, 128, 130, in certain embodiments, are inverters capable of dimming associated light outputs 122, 126, 132, 134 in response to 0-10V dimming signals. The light sources 112, 114, 116, 118, in certain embodiments, are discharge light sources, such as linear fluorescent light sources and high density discharge light sources. In the illustrated example, each light output 122, 126, 132, 134 is associated with a dimmable driver 120, 124, 128, 130. However, a one-to-many mapping between dimmable drivers and light outputs may be used. Additionally, light outputs which are not associated with dimmable drivers may also be used.

Figure 2:
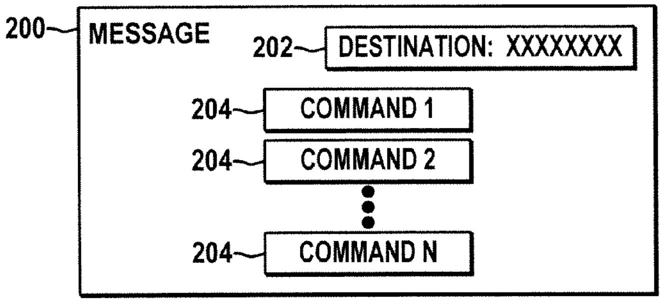
FIG. 2 illustrates a received message for the ballast control unit of FIG. 1.

The wireless interface 102 is connected to a wireless antenna 136 facilitating the reception of messages from a mesh network (not shown), implemented in one embodiment with the ZigBee wireless protocol, but other wireless protocols are equally amenable. Each received message contains a field identifying the destination of the message and one or more commands. The destination field includes the unique id of the network device to which the message is destined. Commands may, for example, be dimming commands and ON/OFF commands. FIG. 2 shows an exemplary message 200 including a destination field 202 and N commands, where N is an integer greater than or equal to 1.

Referring back to FIG. 1, for each received message, the wireless interface 102 determines if the destination of the received message matches the unique id of the ballast control unit 100. If not, the message is retransmitted so that other network devices (not shown) on the mesh network may receive it. If the unique id matches the destination of the received message, the received message is sent to the control module 104.

Since the wireless interface 102 is both sending and receiving messages, it includes a transceiver. Further, the specific wireless protocol used for the mesh network (e.g., ZigBee) is implemented with a microcontroller (not shown), such as a PIC controller, common to both the wireless interface 102 and the control module 104 in one example.

The control module 104 interprets the commands in received messages and controls the plurality of dimmable ballasts 106, 108, 110, and their associated light outputs 122, 126, 132, 134 accordingly. In the case of an ON/OFF command, the control module 104 will enable or disable power to the dimmable ballasts correlated with the command. In the case of a dimming command, the control module will provide a dimming signal, analog or digital, to the dimmable drivers correlated with the command. As should be appreciated, this will have the effect of dimming the light outputs of the corresponding dimmable ballast. Further, the control module 104 makes use of the common microcontroller, noted above, to carry out this function.

To facilitate ON/OFF commands, the control module 104 includes a first relay 138 and a second relay 140. The relays 138, 140 selectively couple power from an external power supply 119 to associated dimmable ballasts 106, 108, 110. The first relay 138 in this example allows the control module 104 to control power to the first dimmable ballast 106 and the second dimmable ballast 108. Similarly, the second relay 140 allows the control module 104 to control power to the third dimmable ballast 110.

If an ON/OFF command directs the control module 104 to disable a dimmable ballast, the control module 104 disables power to the dimmable ballast via a corresponding relay. If an ON/OFF command directs the control module 104 to enable a dimmable ballast, the control module 104 enables power to the dimmable ballast via a corresponding relay. As should be appreciated, an ON/OFF command is limited to the extent that a dimmable ballast correlated with the ON/OFF command shares a relay. For example, an ON/OFF command correlated with the first ballast 106 necessarily affects the second ballast 108 by virtue of sharing a relay 138 and vice versa.

To facilitate dimming commands, the exemplary control module 104 includes a plurality of digital-to-analog (D/A) converters 142, 144. The digital-to-analog converters 142,

144 in one embodiment provide 0-10V dimming signals to the dimmable drivers 120, 124, 128, 130 of the dimmable ballasts 106, 108, 110.

The digital-to-analog converters 142, 144 may be implemented in certain embodiments as R2R ladders or filtered pulse width modulated signals. Additionally, the digital-to-analog converters 142, 144 may, in some embodiments, employ feedback loops to control the dimming signals under varying loads. For example, in the case of a digital-to-analog converter making use of an R2R ladder, the analog dimming signal may ramp up to the target value based upon the feedback. However, it should be appreciated that feedback is not a strict requirement in all embodiments.

The control module 104 further includes a plurality of miswiring circuits 146, 148, 150 to protect the control module 104. The dimming signals in these embodiments pass through the miswiring circuits 146, 148, 150 before connecting to the dimmable drivers 120, 124, 128, 130. In operation, if a power line is inadvertently connected to one of the wires carrying the dimming signals, for example, the miswiring circuit protects the control module 104.

If a dimming command is received, the control module 104 outputs either analog or digital dimming signals to the dimmable driver(s) 120, 124, 128, 130 correlated with the command. Dimming signals represent digital dimming values received as part of dimming commands. If the dimmable drivers to which a command correlates require an analog dimming signal, a digital-to-analog converter (e.g., 142, 144) is used to convert the digital value received in the command to an analog dimming signal, such as 0-10V dimming signals in certain embodiments.

Figure 3:
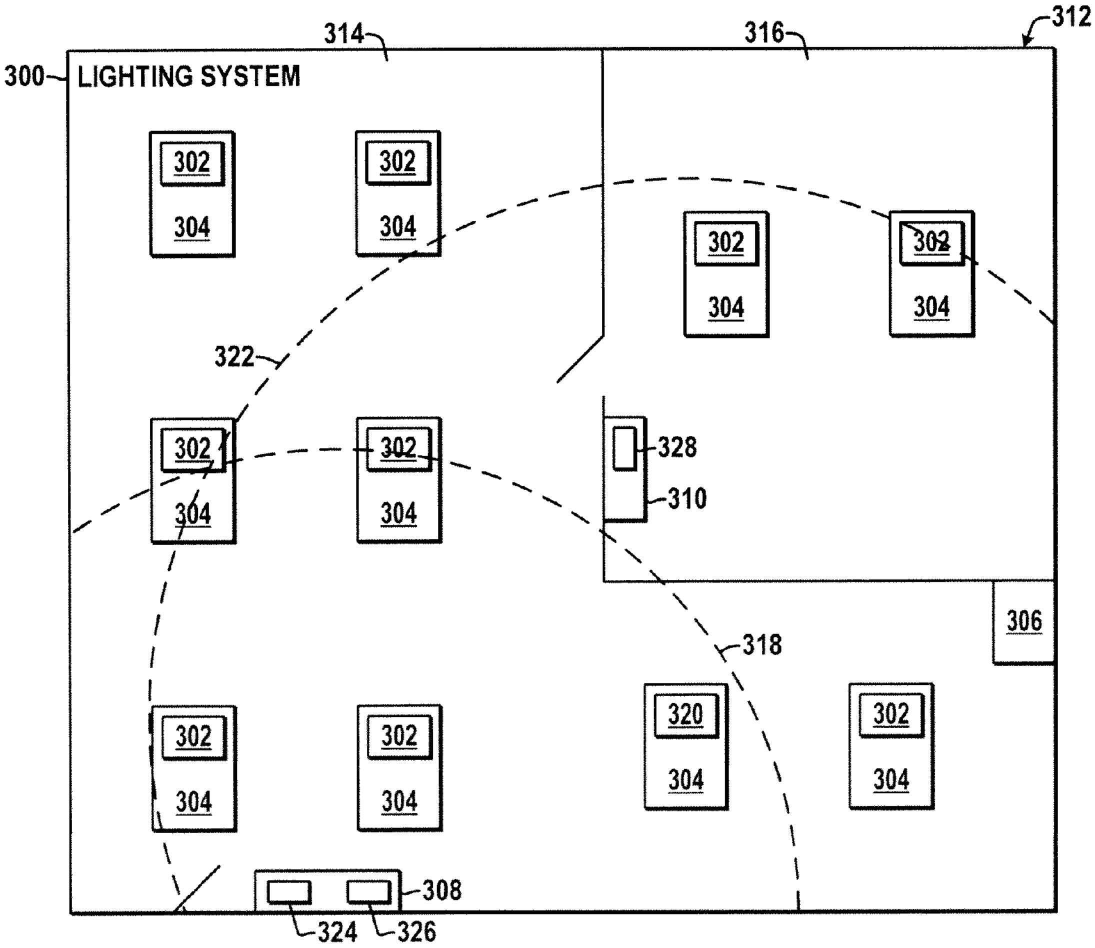
FIG. 3 illustrates an exemplary lighting system having a plurality of ballast control units.

With reference to FIG. 3, an exemplary lighting system 300 is shown having a plurality of ballast control units 302. Each of the ballast control units 302 in this example is associated with a light source 304 having a dimmable ballast disposed therein (not shown). The lighting system 300 further includes a coordinator unit 306, a first switching panel 308, and a second switching panel 310. The lighting system 300 is shown in the context of an office floor plan 312, including a first room 314 and a second room 316.

The lighting system 300 uses a mesh network to facilitate communication between the individual network devices, such as the ballast control units 302. When the network devices 302, 308, 310 initialize, they register with the coordinator unit 306. Namely, each network device 302, 308, 310 sends a message to the coordinator unit 306 alerting the coordinator unit 306 of its presence. In doing so, each network device 302, 308, 310 identifies itself to the coordinator unit 306 with a unique id. Additionally, messages may include information pertaining to the capabilities of the respective network device. For a dimmable light switch, for example, the dimmable light switch may alert the coordinator unit 306 that it triggers dimming events for a certain ballast control unit. The network devices 302, 308, 310, and the coordinator 306, are preferably implemented with a microcontroller, such as a PIC controller.

The illustrated lighting system 300 makes use of a mesh network, such as ZigBee, in which most, if not all, of the network devices route messages. Thus, if a message is not destined for a receiving network device, the network device which actually receives a given message will retransmit the message. For example, a coverage area 318 of the first switching panel 308 does not encompass the coordinator unit 306. However, the coverage area 318 encompasses an intermediary ballast control unit 320 having a radio coverage area 322. This radio coverage area 322 encompasses the coordinator unit 306. Accordingly, the first switching panel 308 is able to communicate with the coordinator unit 306 indirectly via retransmission by the intermediary ballast control unit 320. As should be appreciated, this allows existing lighting systems to be easily retrofitted without the need to run additional wires or install a wireless infrastructure.

The coordinator unit 306, in this example, receives messages from the first switching panel 308 and the second switching panel 310 alerting the coordinator unit 306 of lighting events, for example, a dimming event or a power event. The first switching panel 308 includes a master power switch 324 to turn all the light sources 304 off. Further, the first switching panel 308 include a dimming controller 326 to dim all the light sources 304 in the first room 314. The second switching panel 310 includes a power switch 328 to turn all of the light sources 304 in the second room 316 off.

Based upon these messages from the switching panels 308, 310, the coordinator unit 306 instructs the ballast control units correlated with the commands contained in the messages to act accordingly. Ballasts control units may be correlated with these commands according to one or more of at least two ways. The first way being that the switching panels 308, 310 specify the ballast control units to which the commands relate. For example, the first switching panel 308 may send a message to the coordinator 306 explicitly telling it to act on a specific ballast control unit. The second way being that the coordinator 306 uses a preprogrammed lookup table to determine which ballast control units the commands relate to. For example, the coordinator 306 uses the unique id and the type of command to index into a lookup table and determine which ballast control units correlate to a command.

If the master power switch 324 of the first switching panel 308 is set to the off position, the panel 308 sends a power message to the coordinator unit 306, where the message is correlated to all of the dimmable ballasts (not shown) associated with all of the ballast control units 302. The coordinator unit 306 receives this messages and sends a similar message to each of the ballast control units 302 instructing them to disable power to all of their associated dimmable ballasts. As discussed above, the ballast control units 302 control power via relays. A similar procedure is performed if the power switch 328 of the second switching panel 310 is set to the off position. However, instead of turning all of the light sources 304 off, the coordinator unit 306 only instructs the ballast controls units 302 in the second room 316 to disable power to their associated dimmable ballasts.

If the dimming controller 326 of the first switching panel 308 is adjusted, the first switching panel 308 sends a message containing a dimming command therein to the coordinator unit 306. The coordinator unit 306 receives this message and determines which ballast control units are correlated with the commands contained within the received message. In the case of the dimming command, the coordinator unit 306 determines which light outputs are correlated with the command. Based upon this, the coordinator unit 306 sends messages to the ballast control units associated with the dimming command instructing them to adjust their light outputs accordingly.

Notwithstanding the first switching panel 308 and the second switching panel 310, the coordinator unit 306 may control the ballast control units 302 according to a preprogrammed schedule. Namely, the coordinator unit 306 may be programmed to turn all the light sources 304 on at a certain time and turn all the light sources 304 off at a certain time. Additionally, or in the alternative, the coordinator unit 306 may similarly dim all the light sources 304 at certain times.

The constituent components of the lighting systems disclosed herein, i.e., the ballast control units, the coordinator, etc., may be embodied partially within a computer, or other digital processing device including a digital processor, such as a microprocessor, microcontroller, graphic processing unit (GPU), etc. and storage. In some embodiments, the exemplary methods, discussed above, the system employing the same, and no forth, of the present application are partially embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips.

The invention has been described with reference to the preferred embodiments. Modifications and alterations will occur to others upon reading and understanding the preceding detailed description. It is intended that the disclosure be construed as including all such modifications and alterations.

What is claimed is:

1. A lighting system comprising:

a plurality of ballast control units distributed throughout a defined area, each of the plurality of ballast control units for controlling a light output of a dimmable ballast, wherein the dimmable ballast powers a light source via the light output, said ballast control unit comprising:

a wireless interface provisioned to receive messages from a transmitter, wherein the wireless interface retransmits the received messages not destined for the ballast control unit; and a control module provisioned to control the dimmable ballast and the light output according to commands in the received messages destined for the ballast control unit, wherein each of the commands corresponds to one of the dimmable ballast and the light output;

a mesh network, the plurality of ballast control units communicating over the mesh network using the wireless interfaces of the plurality of ballast control units;

a plurality of light sources, each of the plurality of light source associated with and proximate to one of the plurality of ballast control units;

a coordinator configured to:

receive event messages;

generate messages instructing the plurality of ballast control units to control the plurality of light sources in response to and based on the received event messages; and, transmit the generated messages to the plurality of ballast control units over the mesh network.

2. A lighting system for controlling at least one light output of at least one dimmable ballast via a mesh network, wherein the dimmable ballast powers at least one light source via the at least one light output, the lighting system comprising:

a ballast control unit comprising:

a wireless interface provisioned to receive messages from the mesh network, wherein the wireless interface retransmits the received messages not destined for the ballast control unit; and a control module provisioned to control at least one of the at least one dimmable ballast and at least one of the at least one light output according to commands in the received messages destined for the ballast control unit;

a dimming unit provisioned to transmit messages over the mesh network, wherein each of the transmitted messages contains an ON/OFF command and/or a dimming command; and, a coordinator unit for controlling the ballast control unit, wherein the coordinator unit receives the messages transmitted by the dimming unit and provides the commands contained therein to the ballast control unit;

wherein the dimming unit, the ballast control unit and the coordinator are different devices.

3. A lighting system for controlling at least one light output of at least one dimmable ballast via a mesh network, wherein the dimmable ballast powers at least one light source via the at least one light output, the lighting system comprising:

a ballast control unit comprising:

a wireless interface provisioned to receive messages from the mesh network, wherein the wireless interface retransmits the received messages not destined for the ballast control unit; and a control module provisioned to control at least one of the at least one dimmable ballast and at least one of the at least one light output according to commands in the received messages destined for the ballast control unit;

a dimming unit provisioned to transmit messages over the mesh network, wherein each of the transmitted messages contains an ON/OFF command and/or a dimming command; and, a coordinator unit for controlling the ballast control unit, wherein the coordinator unit receives the messages transmitted by the dimming unit and provides the commands contained therein to the ballast control unit;

wherein the coordinator receives the messages transmitted by the dimming unit without translation or modification; and, wherein the coordinator provides the commands to the ballast control unit by transmitting new messages to the ballast control unit, wherein the new messages are different than the messages transmitted by the dimming unit.

4. A lighting system for controlling at least one light output of at least one dimmable ballast via a mesh network, wherein the dimmable ballast powers at least one light source via the at least one light output, the lighting system comprising:

a ballast control unit comprising:

a wireless interface provisioned to receive messages from the mesh network, wherein the wireless interface retransmits the received messages not destined for the ballast control unit; and a control module provisioned to control at least one of the at least one dimmable ballast and at least one of the at least one light output according to commands in the received messages destined for the ballast control unit;

a dimming unit provisioned to transmit messages over the mesh network, wherein each of the transmitted messages contains an ON/OFF command and/or a dimming command; and, a coordinator unit for controlling the ballast control unit, wherein the coordinator unit receives the messages transmitted by the dimming unit and provides the commands contained therein to the ballast control unit;

wherein both the ballast control unit and the dimming unit register with the coordinator unit; and wherein the registering includes providing the coordinator unit with information regarding capabilities of the ballast control unit and the dimming unit.

5. The lighting system of claim 1, wherein the generating includes:

correlating ballast control units with commands contained in the received event messages by extracting identification of the correlated ballast control units from the received event messages, wherein the generated messages are destined for the correlated ballast control messages.

6. The lighting system of claim 1, wherein the generating includes:

correlating ballast control units with commands contained in the received event messages by looking up the correlated ballast control units in a lookup table, wherein the generated messages are destined for the correlated ballast control messages.

7. The lighting system of claim 6, wherein the looking up is based on unique ids of devices from which the event messages are received by the coordinator.

8. The lighting system of claim 1, further including:

a switching panel including a master power switch generating a master power event message and transmitting the master power event message to the coordinator over the mesh network;

wherein the coordinator is further configured to:

receive the master power event message from the switching panel over the mesh network;

generate one or more ON/OFF messages including commands to turn all light sources of the mesh network OFF or ON; and, transmit the generated ON/OFF messages to the ballast control units over the mesh network.

* * * * *